F. C. EDWARDS & C. J. HUNTER.
SIDE CAR FOR MOTOR CYCLES.
APPLICATION FILED JULY 2, 1912.
1,063,864.
Patented June 3, 1913.
2 SHEETS—SHEET 1.
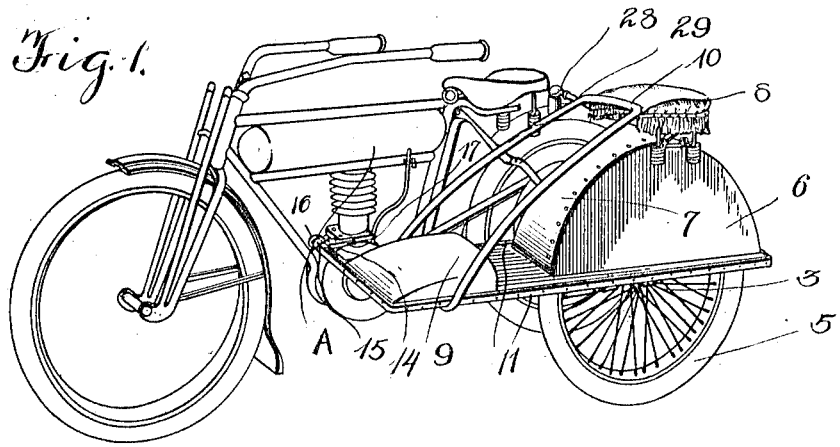
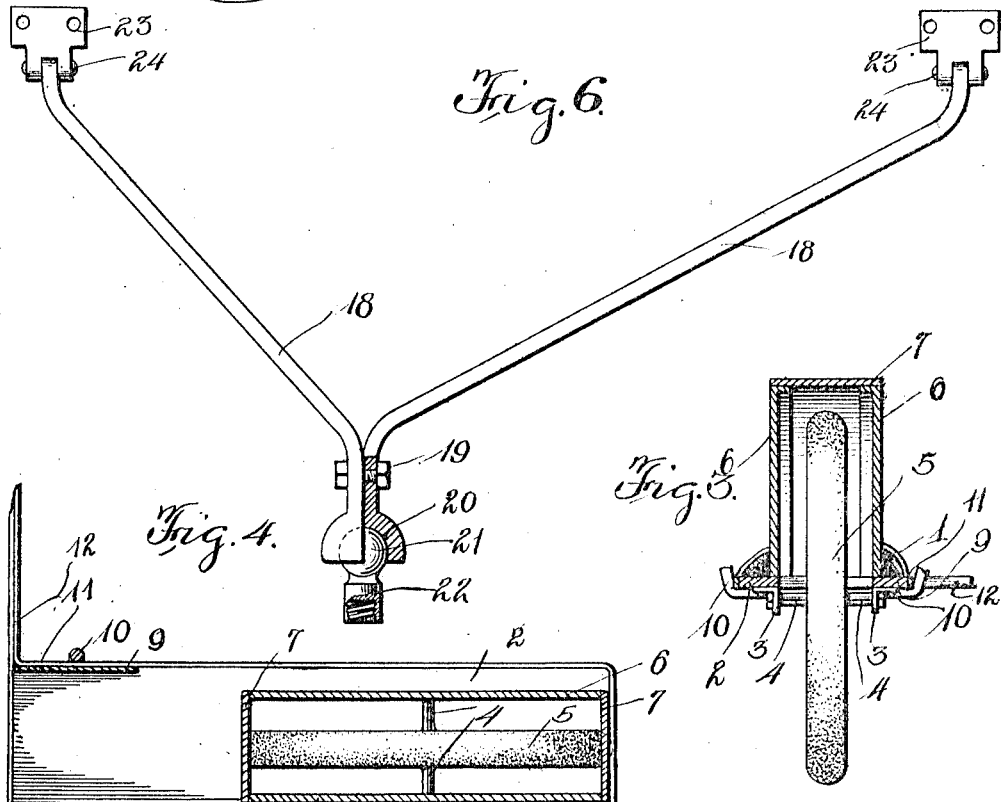

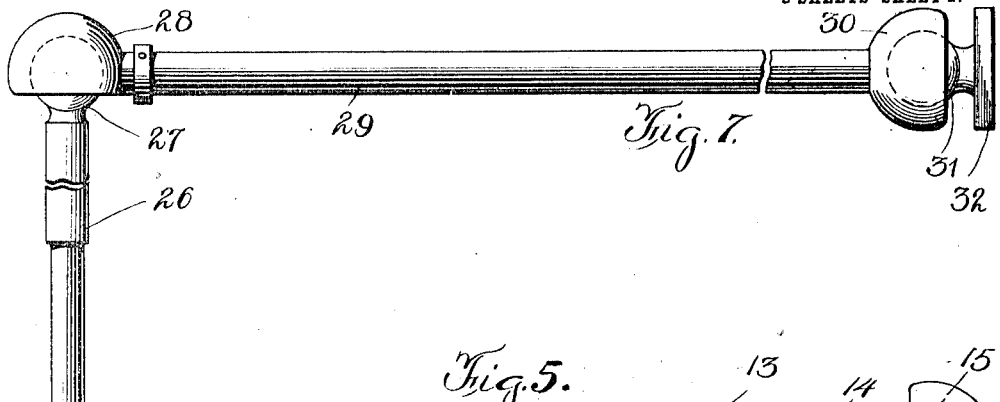
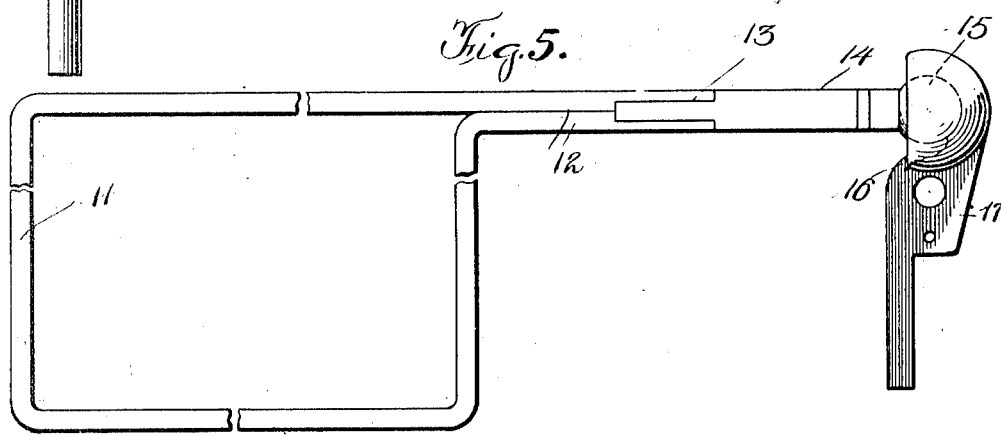
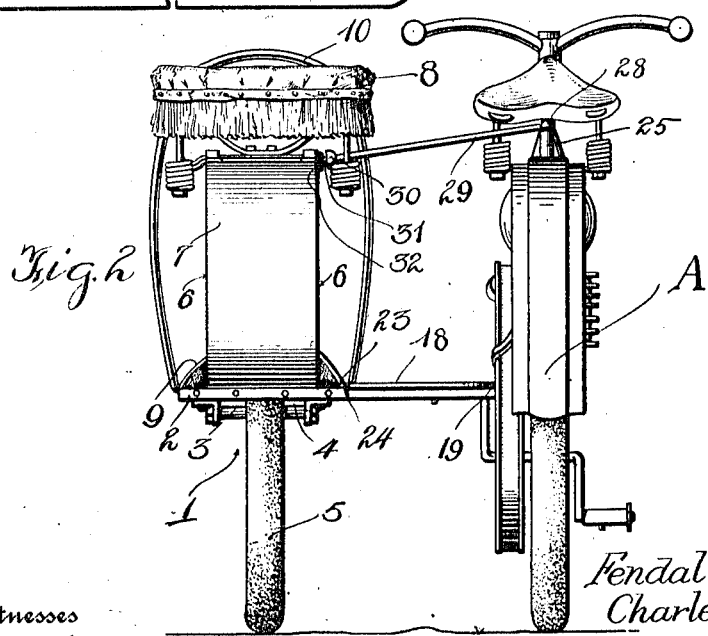

UNITED STATES PATENT OFFICE.

FENDALL C. EDWARDS AND CHARLES J. HUNTER, OF NEWPORT NEWS, VIRGINIA.

SIDE CAR FOR MOTOR-CYCLES.

1,063,864.   Specification of Letters Patent.   Patented June 3, 1913.

Application filed July 2, 1912. Serial No. 707,274.

*To all whom it may concern:*

Be it known that we, FENDALL C. EDWARDS and CHARLES J. HUNTER, citizens of the United States, residing at Newport News, in the county of Warwick and State of Virginia, have invented new and useful Improvements in Side Cars for Motor-Cycles, of which the following is a specification.

This invention relates to improvements in motorcycle attachments and has particular application to what are commonly termed side cars, whereby the carrying or passenger capacity of the machine may be increased.

In carrying out the present invention, it is our purpose to provide an attachment of the class described which when applied to the vehicle, will be capable of having movement relatively thereto so that the vehicle and attachment may move independently of each other in the event of either one meeting inequalities in the roadway or in the path of travel.

It is also our purpose to provide a side car attachment for motorcycles and the like vehicles which will embrace the desired features of simplicity, efficiency, durability and convenience coupled with cheapness of cost in manufacture and marketing and which may be applied to any type of motor vehicle now in general use without materially affecting the structure of such vehicle or resorting to elaborate changes.

With the above recited objects in view and others of a similar nature the invention consists in the construction, combination and arrangement of parts hereinafter set forth in and falling within the scope of the claims.

In the accompanying drawings, Figure 1 is a perspective view of a motorcycle showing our attachment applied. Fig. 2 is a rear view of the same. Fig. 3 is a vertical transverse sectional view through the attachment removed from the machine. Fig. 4 is a horizontal sectional view thereof. Fig. 5 is a detail plan view of one of the connections between the attachment and the vehicle. Fig. 6 is a similar view of another connection. Fig. 7 is a like view of a further connection.

Referring now to the accompanying drawings in detail, the letter A indicates a conventional form of motorcycle which may be of any approved or wellknown construction, while B denotes our attachment or side car as an entirety.

Our improved side car or attachment, in the present instance, includes an elongated base 1 having formed therein adjacent to one end thereof an elongated slot 2, while depending from the under surface of the base at the opposite sides of the slot therein and approximately centrally of the width of such slot, are bearings 3—3 designed to receive an axle 4 supporting a ground wheel 5 extending into the slot in the base and rotatable therein. Extending upwardly from the base 1 at the opposite side of the slot therein and suitably spaced apart are semicircular plates 6—6 fastened in any suitable manner to the respective portions of the base, a segmental strip 7 being fastened onto the peripheral edges of the plates and spanning the space between the same with the effect to cover the wheel, the opposite ends of the segmental plate being fastened to the base 1 adjacent to the ends of the slot. A seat 8 is appropriately fastened to the plate 7 or clamped thereto in any suitable manner and is located in alinement with the axle 4 of the wheel 5 so as to bring about an even and uniform distribution of the weight of a passenger upon such seat. The free end of the base 1, that is, the end remote from the slot 2, is designed to form a foot rest for the feet of the passenger and substantially inclosing such end of the base is a hood 9 adapted to incase the feet of the passenger, while suitably pivoted to the said end of the base is a handle 10, which, in the present embodiment of our invention, embraces a substantially U-shaped yoke, as clearly illustrated in the drawings, the interconnecting bar of the limbs of the yoke being disposed in proximity to the passenger upon the seat so that the same may be grasped by the hands.

The above is a description of the detail mechanical features of our improved attachment of side car and in order to connect such side car to the vehicle or motorcycle A, we employ a number of connectors including universal joints, such joints permitting movement of the side car relatively to the vehicle in all directions. Thus, should the attachment strike a depression, or hump, in the roadway, the same may move without affecting the equilibrium of the operator upon the motorcycle. On the other hand, should the motorcycle or propelling vehicle meet with an obstruction in the roadway, such vehicle will be capable of movement with respect to the side car, thereby avoiding subjecting the passenger to unnecessary shock or vibration. Similarly, when the propelling vehicle and side car take a curve, the side car will have more or less fore and aft movement to enable the same to take the curve gradually and without unnecessary jar or jolt, the passenger as well as the operator leaning or inclining themselves in the same direction, usually toward the center of the curve to enable the vehicle and attachment to proceed evenly and uniformly in its course of travel.

Surrounding the base 1 and suitably fastened to the edges thereof is a strap 11, shown more specially in Fig. 5, having the free extremities of its limbs overlapping each other and bent at right angles to themselves to form a lateral extension 12, the free end of such extension being socketed as at 13. Suitably fastened within the socket 13, as by brazing or the like, is one member of a universal joint, such joint, in the present instance, consisting of a shank 14 having one extremity within the socket while the opposite extremity is formed with a ball 15 universally movable within a socket 16 formed in an attaching plate 17, the latter being adapted to be fastened to an appropriate part of the propelling vehicle, such, for instance, as the crank case of the motor.

In Fig. 6, we have shown a form of attachment designed to be utilized to connect one side edge of the base 1 to the lower extremity of the rear fork of the propelling vehicle. This connection, in the embodiment of our invention selected for illustrative purposes, embodies a substantially Y-shaped metallic yoke consisting of the outwardly diverging limbs 18—18 having their meeting ends suitably bolted together as at 19 and formed to provide a socket 20, the latter receiving a ball 21 having a socketed shank 22 designed to receive a stud carried by the lower end of the rear fork of the motorcycle, the ball and socket forming a universal connection at this point. Bolted or otherwise fastened to the adjacent side edge of the base 1, are hinge members 23—23 suitably spaced apart and provided with pintle pins 24—24 passed through ears in the hinge members and apertures in the respective ends of the Y-shaped yoke. Thus, a pivot or hinge joint is formed between the base of the side car and the free ends of the limbs of the Y-shaped yoke which permits of an up and down movement of the side car relatively to the propelling vehicle and independently of the universal joint formed by the ball and socket 21 and 20, respectively.

The connection between the upper surface of the side car or attachment and the propelling vehicle is effected through the medium of a socket member 25 suitably fastened to an appropriate part of the motorcycle at the rear of the seat thereon and receiving a stem 26 formed at one end with a ball 27 disposed within a socket 28 in one end of a connecting bar 29, the free end of the latter being relatively large and socketed as at 30 to receive a ball 31 equipped with an attaching plate 32 bolted or otherwise fastened to the topmost point of the attachment and beneath the seat on such attachment.

From the foregoing description taken in connection with the accompanying drawings, the construction and manner of employing our invention will be readily apparent. It will be seen that we have provided a side car which may be attached to and detached from a motorcycle or similar vehicle so as to vary the passenger capacity of such vehicle. Furthermore, it will be noted that the side car is capable of longitudinal and vertical movement relatively to or independently of the propelling vehicle, thereby enabling the motorcycle and attachment to proceed in the path of travel without affecting each other, incident to meeting obstructions in the roadway and other causes.

While we have herein shown and described one particular embodiment of our invention by way of illustration, it is to be understood that we do not confine ourselves to the precise details of construction herein described and delineated, as modifications and variations may be made within the scope of the claims without departing from the spirit of the invention. For instance, any suitable form of universal joint may be employed to effect the connections between the side car and the propelling vehicle, the ball and socket construction of such joint herein defined being merely for the sake of example.

It may be here stated, and it will be readily seen, that the seat upon the attachment or side car may be removed and the side car converted into a luggage or baggage carrier.

We claim:

1. A side car adapted for attachment to a motorcycle and comprising a base having a slot therein adjacent to one end thereof, bearings depending from said base at the opposite sides of the slot therein, an axle journaled in said bearings, a wheel on the axle and within the slot, semi-circular plates secured to the upper surface of said base at the opposite sides of the slot therein and spaced apart, a segmental strip secured to the peripheral edges of said plates, a seat upon said plate at the center thereof, and a foot rest formed at the free end of said base.

2. The combination with a motorcycle, of a side car adapted for attachment thereto, and connections between said motorcycle and said car, said connections including a strap substantially inclosing the side car, a universal joint between the strap and the motorcycle, a Y-shaped yoke, hinge connections between said yoke and side car, a universal joint connecting the yoke to the motorcycle, a connecting bar, and universal joints between the connecting bar and the side car and the bar and the motorcycle.

In testimony whereof we affix our signatures in presence of two witnesses.

FENDALL C. EDWARDS.
CHARLES J. HUNTER.

Witnesses:
J. M. HARRIS,
M. L. LONG.